Figure 1:
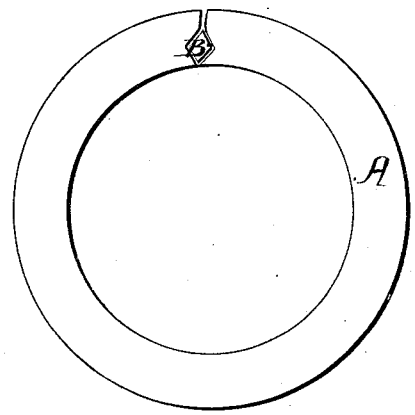
Figure 2:
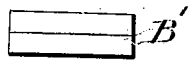
Figure 3:
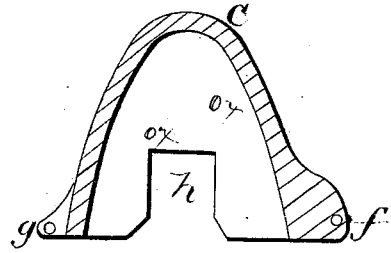

I. Lamplugh.

Welding Tires for Locomotive Wheels.

Nº 83,177. Patented Oct. 20, 1868.

Witnesses;
V. D. Stockbridge
A. M. Mann

Inventor;
Isaac Lamplugh
an
Alexander Heaton
att

ISAAC LAMPLUGH, OF PEORIA, ILLINOIS.

Letters Patent No. 83,177, dated October 20, 1868; antedated October 3, 1868.

IMPROVED METHOD OF WELDING TIRES.

The Schedule referred to in these Letters Patent and making part of the same

*To all whom it may concern:*

Be it known that I, ISAAC LAMPLUGH, of Peoria, in the county of Peoria, and in the State of Illinois, have invented certain new and useful Improvements in Mode of Welding Cast-Steel Tires for Locomotives; and do hereby declare that the following is a full, clear, and exact description thereof, reference being had to the accompanying drawings, and the letters of reference marked thereon.

In the annexed drawings, making a part of this specification, A represents a cast-steel tire for locomotive-engine or other wheels.

Said tire is cast in the usual manner, and the ends thereof are then cut out in diamond-shape, as shown at B, to receive a diamond-shaped plug, B', made to fit therein.

The diamond-shape is best, though a round or square shape might be made to answer the same purpose nearly as well.

The hole is made in the ends, or between them where said ends meet, and a plug, B, is inserted therein, when both are heated as required, for the purpose of preventing any rebound or vibrating of either from the other, which may prevent the welding of the parts, or obstruct the same.

B' represents a plug ordinarily made diamond-shaped, but may be made round or square, and of sufficient length to reach through the thickness of the tire A, or may be made one-half of said thickness, and the parts driven into the hole B each way until they meet.

The single plug, or plug which reaches all of the way through, is most convenient in practice.

C represents a portable furnace, to be attached or secured to any forge by means of hinges on one side at $g$.

This furnace C is made nearly conical, and provided with slots $h$ on opposite sides, so as to just fit over and cover a tire, A, and is provided with suitable holes or apertures $x$, through which coal or fuel may be inserted, and to afford a window or chance for observing the heating of the metal of the tire.

When the metal is heated as required, this furnace C may be turned on its hinge at $g$, and raised off or away from the object, by means of a suitable hook catching in the hole $f$.

It will readily be seen that this furnace will confine the heat to that part of the metal inside of it, and heat the same much faster and requiring much less fuel than by any known device.

This furnace C may be made of metal and lined with fire-brick or otherwise, as may be desired, and may be used with advantage at all forges, so as to confine the heat to the object, and to protect the operator from the direct rays of heat and light of the fire.

By placing the tire A beneath the furnace C, at the point to be welded, and bringing the same up to the heat required, and then inserting the plug B' in the cavity therefor, the said tire A may be forged and welded without any difficulty usually attending the welding of cast-steel tires.

I am aware that various-shaped plugs have been welded between the ends of tires.

What I claim, is—

The combination of the tire A, provided with a V-shaped notch at each end, within which is inserted a diamond-shaped plug, B, which is welded to and forms a part of the tire, in the manner and for the purposes set forth.

In testimony that I claim the foregoing, I have hereunto set my hand, this 1st day of February, 1868.

ISAAC LAMPLUGH.

Witnesses:
 M. RAPPELIUS,
 W. C. SULT.